Figure 9:
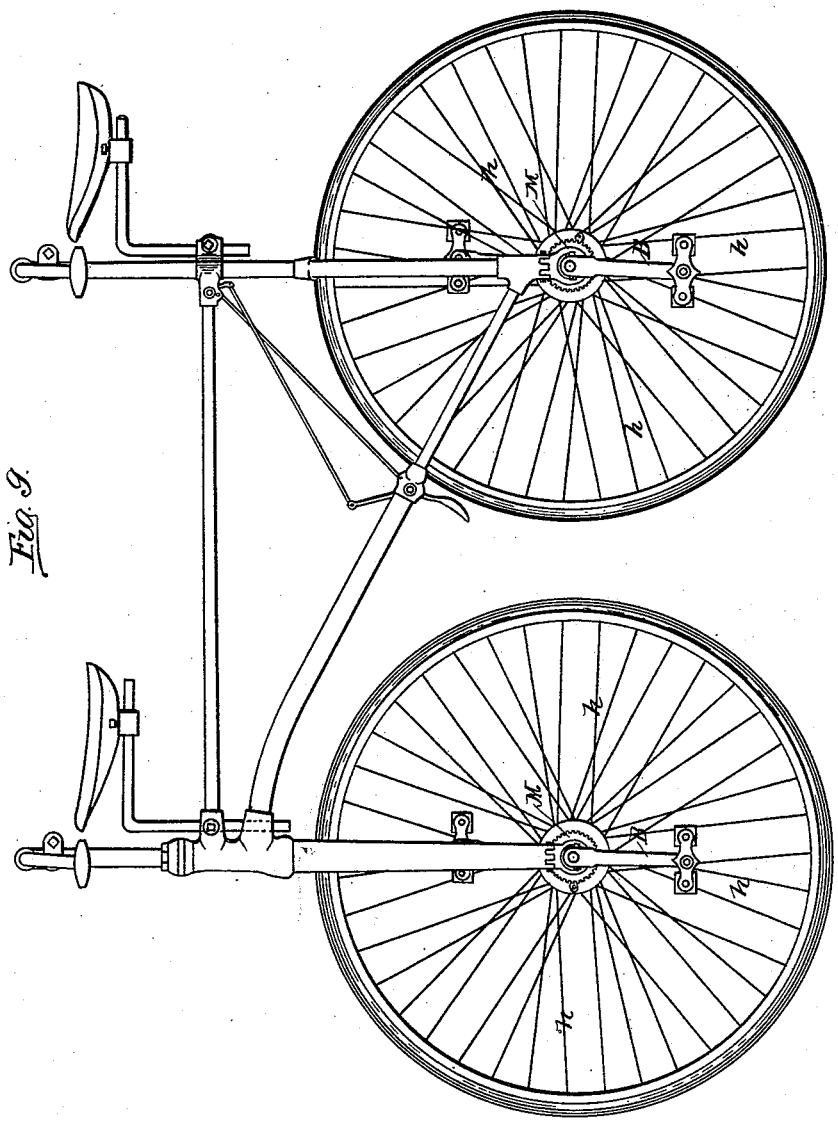

(No Model.) 4 Sheets—Sheet 1.
H. G. BARR & F. E. PECK.
VELOCIPEDE.
No. 457,242. Patented Aug. 4, 1891.
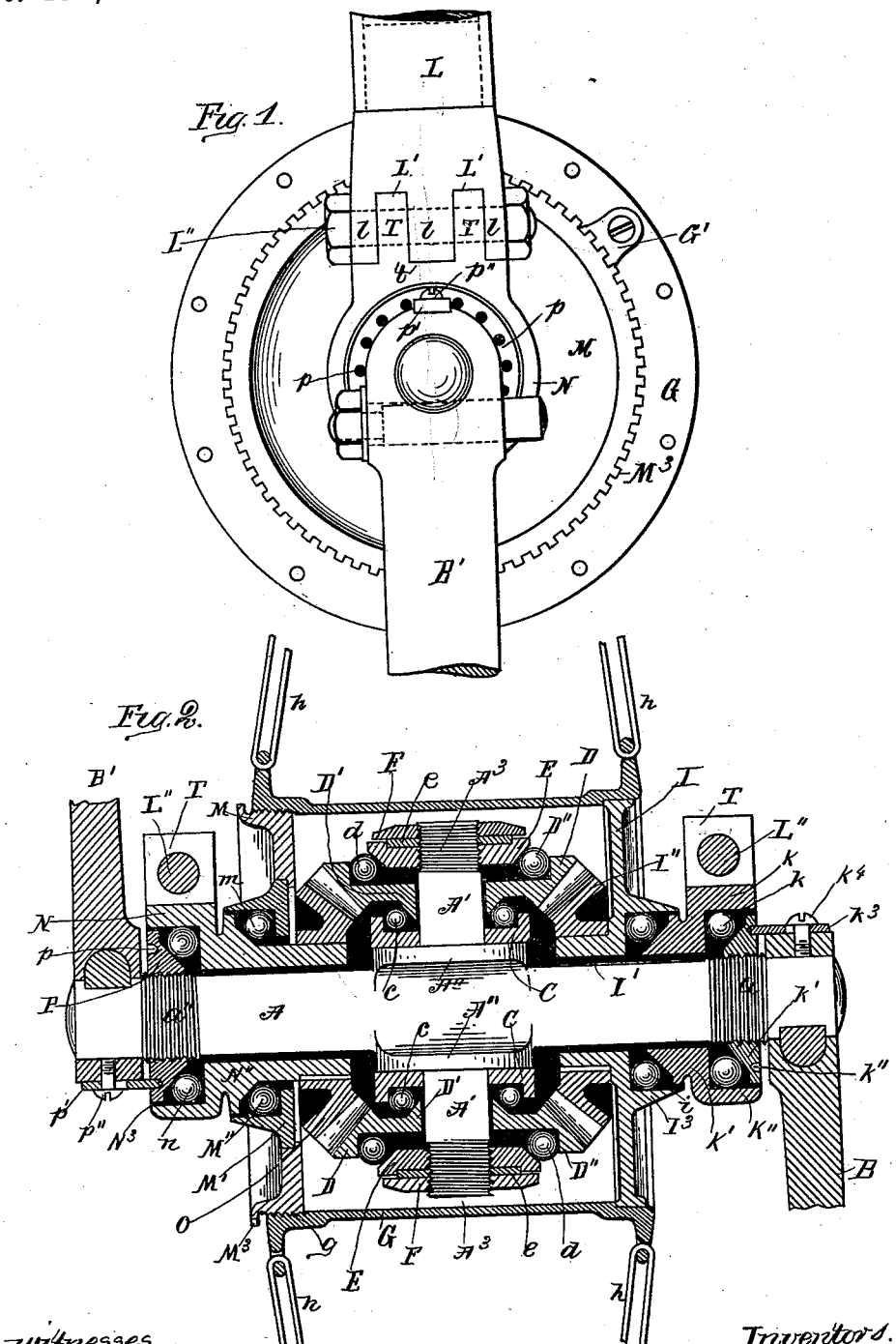
Witnesses
Thomas W. Hobday
Geo. W. White
Inventors.
Henry G. Barr
and Frank E. Peck
by Alban Andrén their atty.

(No Model.) 4 Sheets—Sheet 2.
H. G. BARR & F. E. PECK.
VELOCIPEDE.
No. 457,242. Patented Aug. 4, 1891.
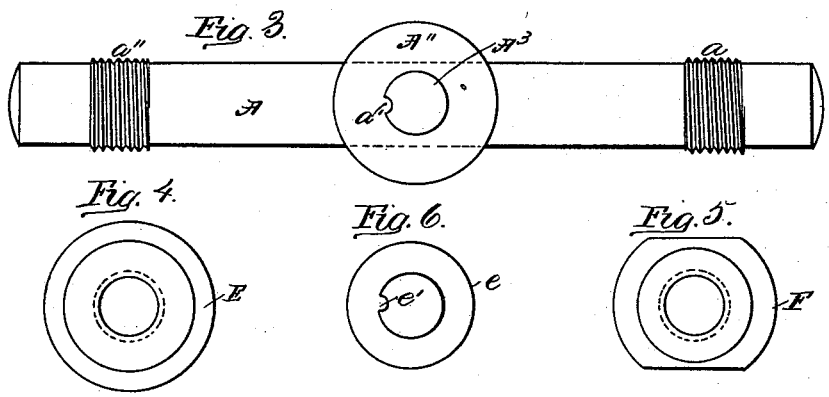
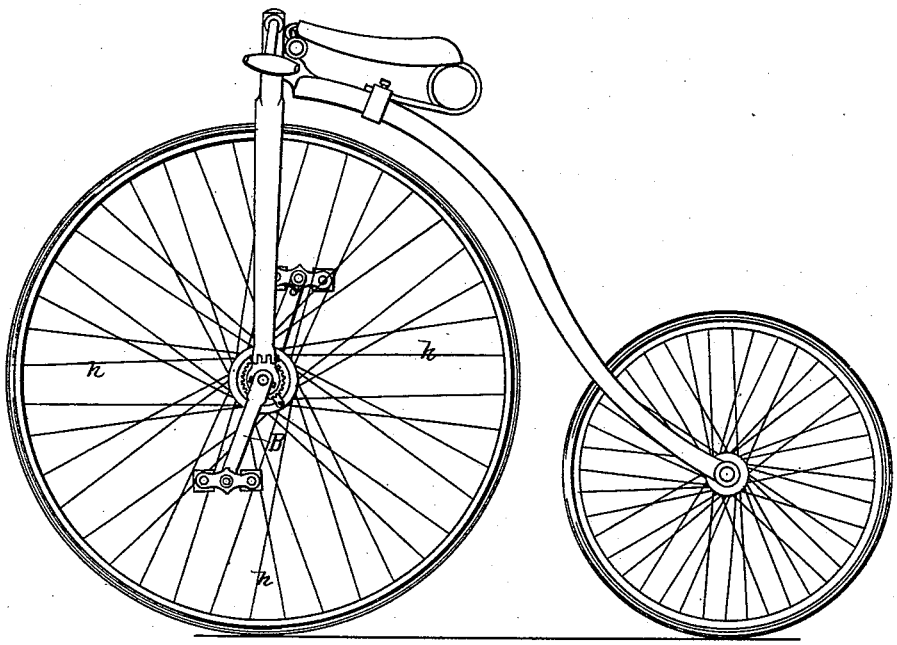
Witnesses
Thomas W. Holiday
Geo. B. White
Inventors.
Henry G. Barr
and Frank E. Peck
by Alban Andrin
their attys.
THE NORRIS PETERS CO., PHOTO-LITHO., WASHINGTON, D. C.

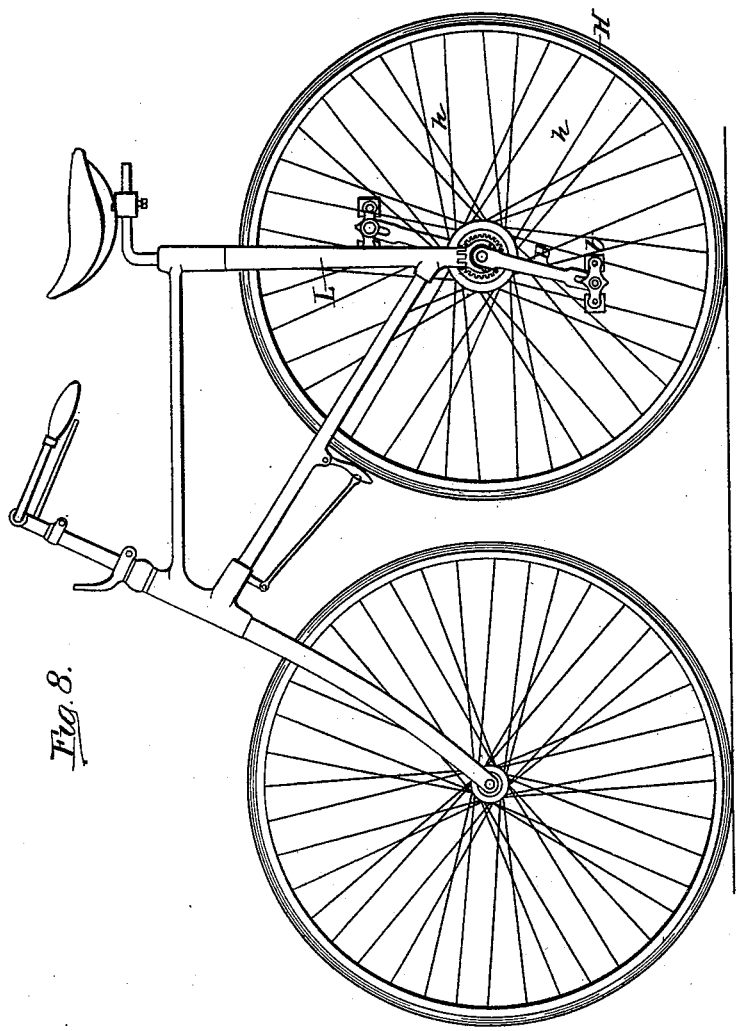

(No Model.) H. G. BARR & F. E. PECK. 4 Sheets—Sheet 4.
VELOCIPEDE.

No. 457,242. Patented Aug. 4, 1891.

UNITED STATES PATENT OFFICE.

HENRY G. BARR, OF WESTBOROUGH, AND FRANK E. PECK, OF EAST WAREHAM, MASSACHUSETTS; SAID PECK ASSIGNOR TO EMERSON W. LAW, OF CAMBRIDGE, MASSACHUSETTS.

VELOCIPEDE.

SPECIFICATION forming part of Letters Patent No. 457,242, dated August 4, 1891.

Application filed October 1, 1890. Serial No. 366,748. (No model.)

*To all whom it may concern:*

Be it known that we, HENRY G. BARR, a citizen of the United States, and a resident of Westborough, in the county of Worcester and State of Massachusetts, and FRANK E. PECK, a citizen of the United States, and a resident of East Wareham, in the county of Plymouth and State of Massachusetts, have jointly invented new and useful Improvements in Velocipedes, of which the following, taken in connection with the accompanying drawings, is a specification.

This invention relates to that type of epicycle-gear mechanism for velocipedes described and shown in Letters Patent No. 437,820 to Frank E. Peck and No. 437,827 to Frederick White, issued October 7, 1890.

The objects of the present invention are to improve the prior devices and to render them more useful, efficient, and satisfactory in practical operation by reducing friction in a large measure.

To accomplish these objects our invention involves the features of construction, the combination or arrangement of parts, and the principles of operation hereinafter described and claimed, reference being had to the accompanying drawings, in which—

Figure 1 represents an end elevation of our improved driving-wheel hub, showing a portion of the forked frame and one of the cranks. Fig. 2 represents a central longitudinal section of said improved driving-wheel hub. Fig. 3 represents a detail side view of the axle as seen from the end of one of its cross-trunnions. Fig. 4 represents a detail plan view of one of the cone-nuts screwed on the cross-trunnions of the axle. Fig. 5 represents a detail view of one of the lock-nuts used on said cross-trunnions, and Fig. 6 represents a detail plan view of the washer interposed between said cone and lock nuts. Fig. 7 represents a side elevation of a front-driver velocipede provided with our improvements. Fig. 8 represents a side elevation of a rear-driver velocipede provided with our improvements; and Fig. 9 represents a side elevation of a front and rear driver velocipede also provided with our improvements.
Similar letters refer to similar parts wherever they occur on the different parts of the drawings.

A represents the axle, to the ends of which are secured, as usual, the cranks B B', provided with pivoted treadles $b$ $b$. The said axle is made in the form of a cross having midway upon it diametrically-opposed radiating trunnions A' A', having each an enlarged base or rest A'' at the junction with the axle A, which bases serve as supports for the cups or ball-cases C C, which are firmly secured to the trunnions A' A', as shown in Fig. 2. Within the cups or ball-cases C C are located a series of balls $c$ $c$, and on each short arm or trunnion A' is loosely located an intermediate bevel-gear D, having on its under side a cone D', adapted to roll against the balls $c$ $c$, and by such arrangement a three-point-contact anti-frictional bearing is established between the ball-case or cup C and the gear-cone D', as shown in Fig. 2, one of such contacts being made between the balls $c$ and the gear-cone D' and the two others between said balls and the bottom and inside of the ball-case or cup C. Each short cross-arm or trunnion A' has a screw-threaded portion $A^3$ in its outer end, as shown in Fig. 2. Each intermediate gear D has in its outer end an annular cup or ball-case D'', in which are located the anti-friction balls $d$ $d$.

E is a cone-nut screwed onto each of the screw-threaded ends $A^3$ of the radial trunnions A' of the axle, by which a three-point-contact anti-friction bearing is established between the gears D D and their adjustable cone-nuts E E, as shown in Fig. 2, one of such contacts being established between the balls $d$ and the under side of the cone-nut E and the others between said balls and the bottom and inside of the cup or ball-case D'' on the gear D. On top of each cone-nut E is located a washer $e$, which is prevented from turning around its corresponding screw-threaded trunnion part $A^3$, preferably by having an internal lip $e'$, adapted to enter a longitudinal groove $a'$ on the side of the screw-threaded portion $A^3$, as shown in Figs. 3 and 6. On top of each such washer $e$ is located the lock-nut F, (shown in Figs. 2 and 5,) by means of which the cone-nut D'' is locked in position after being properly adjusted from time to time to compsensate for wear. By the use of a non-rotating washer $e$, interposed between the cone and lock nuts, as above described, the latter may be tightened without turning or disturbing the position of the cone-nut.

G is the hub-shell of the wheel-rim H, to which it is attached by means of wires $h\,h$, as usual. To one end of the shell G is firmly fixed an end piece or disk I, which is preferably forced into the end of the hub-shell and secured by a key or feather, so as to become practically a part of said hub-shell, as shown in Fig. 2. The end piece I has an inwardly-projecting sleeve $I'$, surrounding loosely the shaft A, and to such hollow hub $I'$ is firmly secured in a suitable manner a bevel-gear $I''$, the teeth of which mesh into the teeth of the intermediate gears D D, as shown in Fig. 2. The gear $I''$ thus becomes practically a part of the hub-shell G. On the outside of the end piece I is an annular recess $I^3$, in which are contained a series of anti-friction balls $i\,i$, adapted to roll against a conical projection $K'$, which forms a part of the ball-case K, which latter is secured to the lower end of one side of the forked frame L, as shown in Figs. 2, 7, 8, and 9. By this arrangement a three-point-contact anti-friction device is established between the end piece I and the inner end of the ball-case K, one of such contacts being established between the conical projection $K'$ and the anti-friction balls $i$ and the other two between said balls and the bottom and side of the cup-shaped recess $I^3$, as shown in Fig. 2.

The ball-case K has in its outer end an annular cup-shaped recess $K''$, in which are contained a series of anti-friction balls $k\,k$. (Shown in Fig. 2.)

$a$ is a screw-threaded portion of the axle A inside of the place where one of the cranks B is secured, and on such screw-threaded portion is screwed a cone-nut $k'$, the conical portion of which serves as a bearing-surface for the balls $k\,k$, and by this arrangement a three-point-contact anti-frictional device is established between the ball-case K and the adjustable cone-nut $k'$, one of such contacts being established between the balls $k\,k$ and the conical surface of the cone-nut $k'$ and the other two between said balls and the bottom and side of the annular recess $K''$ in the ball-case K, as shown. For the purpose of securing the cone-nut $k'$ in place upon the axle A after being adjusted in position thereon, I provide its outer face with a series of perforations $k''\,k''$, adapted to receive the end of a locking-plate $k^3$, secured to the crank B by means of a screw $k^4$ or equivalent device. The opposite end of the hub-shell G is provided with an internal screw-thread $g$, into which is adjustably secured the screw-threaded soft-metal end piece M, to the central part of which is preferably attached the annular disk $M'$, as shown in Fig. 2. The end piece M is preferably shrunk while heated on the center disk $M'$, which is hardened for the purpose of making such center piece hardened and of standard size and enabling the outer soft-metal end piece M to be afterward screw-threaded and fitted to the internal screw-thread $g$ of the wheel-hub G. The parts M $M'$ may, however, be made in one single piece; but it is more advantageous to make them in two parts secured together as above specified. The disk $M'$ has in its outer end an annular recess $M''$, adapted to contain the anti-friction balls $m\,m$, as shown in Fig. 2.

N is the ball-case secured to one of the lower ends of the forked frame L, which ball-case has made in one piece with it an inwardly-projecting sleeve $N'$, to which is firmly secured in a suitable manner a bevel-gear O, the teeth of which mesh in the teeth of the intermediate gears D D, as shown in Fig. 2. The sleeve $N'$ is also provided with a cone-bearing surface $N''$, by which and the annular recess $M''$ a three-point-contact anti-friction bearing device is obtained, one of such bearing-contacts being established between the balls $m\,m$ and the other two between said balls and the bottom and side of the annular recess $M''$ in the center disk $M'$, as shown in Fig. 2.

The ball-case N has in its outer end an annular recess $N^3$, adapted to contain a series of anti-frictional balls $n\,n$, as shown in Fig. 2. On a screw-threaded portion $a''$ of the axle A is adjustably screwed the cone-nut P, which serves as a bearing-surface for the balls $n\,n$, and by this arrangement a three-point contact is established between the ball-case N, the cone-nut P, and the balls $n\,n$, one of such contacts being established between the cone-nut P and the balls $n\,n$ and the other two between said balls and the bottom and side of the annular recess $N^3$, as shown in Fig. 2.

The cone-nut P has on its outer face a series of recesses $p\,p$, into either one of which is secured the inner end of a locking-plate $p'$, adjustably secured to the crank $B'$ by means of a set-screw $p''$ or equivalent device.

By the construction of the wheel-hub and its component parts, as above described, great anti-friction results are obtained, and the wheel can be driven with a minimum of frictional resistance. This result is attained by the cones formed with the screw-nuts E, gears D, ball-case $K'$, ball-case N, and screw-nuts $k'$ and P, for by these cones we reduce the surface contact with the balls, provide an improved three-point-contact bearing, and avoid the grinding action which results from the presence of rounded convexed bearing-surfaces which form seats for the balls, as heretofore in this type of epicycle-gear mechanism for velocipedes. It will of course be readily understood that when the axle A is rotated it causes an increased rotary motion to be imparted to the hub G and its wheel in the same direction, as is common in multiple-geared velocipedes.

By having the end piece M detachably secured to the wheel-hub G the internal gear mechanism may be removed from within the said hub at any time desired simply by detaching the crank B and cone-nut k' from the end of the axle A. If then the end piece M is detached from the wheel-hub G, the axle and the gears D D O may be drawn out of the hub-shell, thus enabling any desired adjustment or repairs of such parts to be made.

In adjusting the gears and ball-bearings the adjustable hub end M M' is screwed in out of the way and the axle cone-nuts screwed up until the gears mesh properly, after which the said cone-nuts are locked in place by the projections p' k³ on the cranks, as hereinbefore mentioned. The adjustable hub end M M' is then unscrewed until the hub is made to fit properly on the ball-cases and their anti-friction balls, after which the said adjustable hub end is secured in place to the wheel-hub G by means of a toothed locking-piece G', secured, preferably, by means of a screw or other equivalent device to the wheel-hub and having its teeth interlocking in a toothed surface M³, as shown in Fig. 1.

The ball-cases K N have each two or more tenons T T, having squared ends and intervening square bottom spaces t adapted to fit in corresponding square-ended spaces and tenons L' l in the end of the forked frame L, and are secured together by means of a bolt L". The object of this form of joint is to hold the ball-cases strictly in line with the axle and to keep them in truth while operating the wheel.

Having thus fully described the nature, construction, and operation of our invention, we wish to secure by Letters Patent, and claim—

1. In a velocipede, an axle having screw-threaded radial trunnions and central enlargements, annular ball-cases supported on the latter, and an anti-friction bearing-gear arranged upon each trunnion and having a cone, combined with screw-threaded nuts engaging the threaded parts of the radial trunnions and each formed with a cone, the non-rotating washers splined on the radial trunnions and bearing against the cone-nuts, and a lock-nut arranged upon the outer screw-threaded end of each of the said trunnions, substantially as and for the purpose set forth.

2. The combination, in an epicycle train for a velocipede, of an axle having radial trunnions, ball-cases arranged on the latter and containing a series of anti-friction balls, a beveled gear loosely mounted on each trunnion and having a cone on its under side to roll on the anti-friction balls, a series of anti-friction balls supported in a recess in the outer side of each beveled gear, a screw-threaded nut screwed on each trunnion and formed with a cone, a non-rotating washer bearing on each cone-nut, and a lock-nut screwed to the outer end of each trunnion and adapted to be tightened without moving the cone-nuts, substantially as described.

3. The combination, in an epicycle train for a velocipede, of an axle having radial trunnions, bevel-gears mounted upon the axle and its trunnions, a hollow hub-shell surrounding the gears and having at one end a fixed head I and at the opposite end an adjustable screw-threaded head M, and three-point-contact ball-bearings located between said fixed and adjustable heads and comprising cones on the bevel-gears and screw-threaded nuts having cones, substantially as described.

4. The combination, in an epicycle train for a velocipede, of an axle A, having radial trunnions A', carrying beveled gears D, each having cones D', a hollow hub-shell G, having at one end a fixed head I, formed at one side with an external ball-case I³ and at the opposite side with an internal sleeve I', carrying a beveled gear I", a ball-case K, connected with the fork-frame L of the velocipede and provided with a cone K', a cone-nut k', screwed to the axle, an adjustable head M, screwed to the hub-shell opposite the fixed head and having a recess, a ball-case N, secured to the fork-frame of the velocipede and having a cone N" and a sleeve N', which extends through the adjustable head and carries the beveled gear O, a cone-nut P, screwed on the axle, and sets of anti-friction balls against which the several cones bear, substantially as described.

5. The combination, in an epicycle train for a velocipede, of a rotary axle A, having radial trunnions A', provided with ball-cases C, and beveled gears D, having cones D', bearing against anti-friction balls in the ball-cases, a set of anti-friction balls arranged in a recess at the outside of each beveled gear, a cone-nut E, screwed to each trunnion, a hollow hub-shell G, a head I, fixed in one end of the hub-shell and formed with an external ball-case I³ and an internal sleeve I', which carries a beveled gear I", an adjustable head M, screw-threaded to the opposite end of the hub-shell and having a ball-recess M", a ball-case N, connected to the fork-frame L of the velocipede, having a cone N" and a sleeve N', which extends through the adjustable head and carries a beveled gear O, a cone-nut P, screwed to the axle, a ball-case K, secured to the fork-frame of the velocipede and having a cone K', bearing against anti-friction balls in the ball-case of the head fixed to the hub-shell, and a cone-nut k', screwed to the axle, substantially as described.

6. The combination, in an epicycle train for a velocipede, of a rotary axle A, having radial trunnions A', carrying beveled gears D, each provided with a three-point-contact ball-bearing, a hollow hub-shell G, inclosing the said beveled gears, a head I, fixed in one end of the hub-shell and having an external ball-case I³ and an internal sleeve I', carrying a beveled gear I", an adjustable head M, screw-threaded into the opposite end of the hub-shell, a ball-case N, connected with the fork-frame L of the velocipede, having a cone N"

and a sleeve N', projecting through the adjustable head and carrying a beveled gear O, a cone-nut P, screwed to one end of the axle, a ball-case K, arranged at the opposite end of the axle, connected with the fork-frame of the velocipede, and having a cone K', and a cone-nut k', screwed to the axle, substantially as described.

In testimony whereof we have signed our names to this specification, in the presence of two subscribing witnesses, on this 18th day of September, A. D. 1890.

HENRY G. BARR.
FRANK E. PECK.

Witnesses:
ALBAN ANDRÉN,
ALICE A. PERKINS.